G. H. WELLS.
Threading Screws.
No. 63,446.
Patented April 2, 1867.
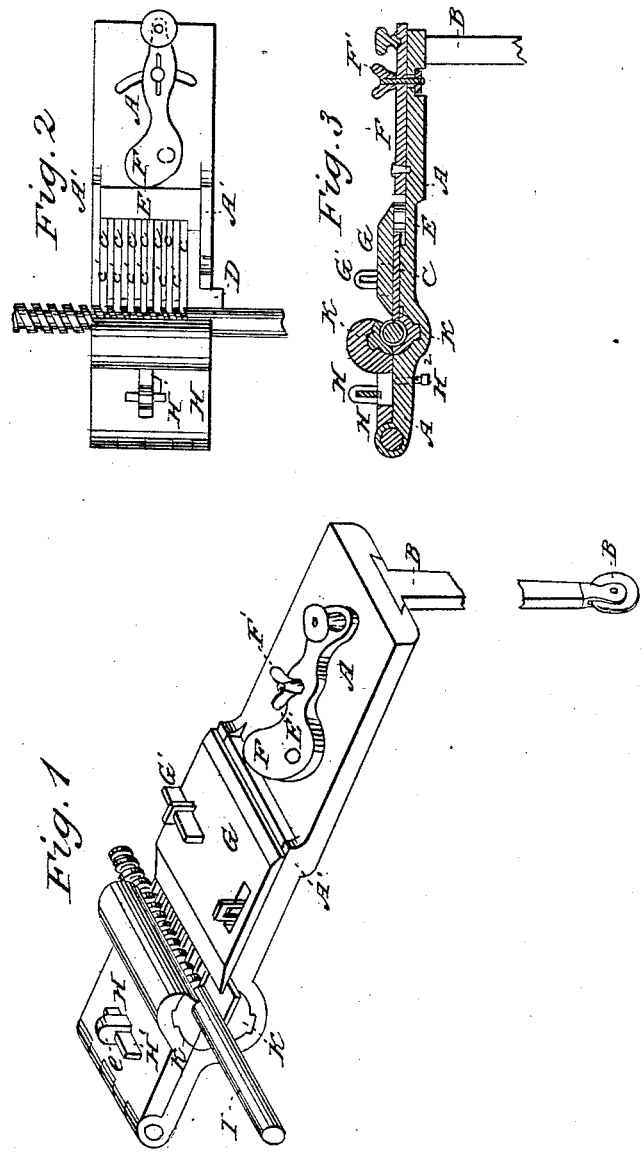

United States Patent Office.

GEORGE H. WELLS, OF LOGANSPORT, INDIANA, ASSIGNOR TO HIMSELF AND JUDSON A. CLEVELAND, OF SAME PLACE.

Letters Patent No. 63,446, dated April 2, 1867.

IMPROVED MACHINE FOR CUTTING SCREWS.

*The Schedule referred to in these Letters Patent and making part of the same.*

TO ALL WHOM IT MAY CONCERN:

Be it known that I, GEORGE H. WELLS, of Logansport, in the county of Cass, and State of Indiana, have invented a new and useful improvement in Screw-Cutting and Turning Machinery; and I do hereby declare that the following is a full, clear, and exact description of the same, reference being had to the annexed drawings, making part of this specification, in which—

Figure 1 is a perspective view.

Figure 2 is a plan; and

Figure 3 is a vertical longitudinal section.

In all the figures the same letters are employed in the indication of identical parts.

A is the stock or body of the adjustable clamp which sustains the mechanism, and which traverses the length of the rod upon which the screw is to be cut, being maintained in a horizontal position by the adjustable leg B, which may be lengthened or shortened, as required, and which rests upon the roller B', travelling upon the ways of the lathe. A' A' are raised sides of the stock, between which the cutters are arranged. The cutters C are four-sided prisms, with a cutting edge upon the end; they are placed in the stock, and separated by the fillets C'. The width of the fillets determines the width of the thread, and the width of the cutters determines that of the space between the threads of the screw to be cut. D is a cutter for turning off the surface of the rod and smoothing the edges of the thread. The several cutters, C, are made each slightly longer than the one which precedes it, reckoning in the order in which they are arranged from the side on which the cutter D is placed, being that towards which the cutter is fed in cutting the screws from point to head. The bases of the several cutters and fillets rest against the sliding plate E, which is fitted between the sides A' A'. The eccentric-cam F is so pivoted that by turning the long end of the lever it will press against and give a forward feed to the plate E, which moves the cutters and fillets. This cam, F, may be fastened in any position by the clamping set-screw F', which passes through a curved slot in the stock, the head thereof being drawn against the bottom of the stock by a nut on the top of the cam-lever. When the cutters are properly arranged in place they are secured by the adjustable plate G, which is secured by keys passing through slots in lugs projecting from the sides A', or in any other convenient manner. The clamping-jaw H is hinged to the end of the stock A, and may be secured, when folded over the top of the stock, by a key passing through the slotted lug $H^1$, projecting through it from the upper face of the stock. The rod upon which the thread is to be cut being secured between the centres of the lathe is clamped between the end of the jaw H and a curved depression in the stock immediately in front of the cutters. In order to permit the adjustment of the clamp to rods of different sizes, the stock A and jaw H are respectively fitted to receive adjustable pieces, K, which slide into dove-tailed grooves cut in the said parts. These pieces are all of the same form on the exterior sides where they fit into their respective beds, but the curves of their inner faces are made to correspond to the various sizes of rods intended to be used in cutting screws. Slight variations in the sizes of the rods between the sizes of rods intended to be provided for by the assortment of adjustable pieces K may be provided for by the set-screws H', which pass through the stock A and project from its upper face. By the amount of this projection the distance between the jaws may be regulated, the clamp being drawn down against the rod by the wedge-formed key passing through the slotted lug $H^1$.

This adjustable clamp may be also employed in turning shafting. In this case suitable cutters are substituted for the ones shown in the drawings, and the feed will be regulated by attaching the stock to an ordinary engine lathe. The clamp will in that case prevent any tremulous motion in the bar to be turned, which prevents the use of the ordinary lathe in turning small shafting.

What I claim as my invention, and desire to secure by Letters Patent, is—

1. The combination of the stock A, hinged jaw H, and adjustable cutters C, substantially as described.

2. The combination of the stock A, cutters C, bar E, cam F, constructed and arranged substantially as and for the purpose set forth.

3. The combination of the stock A, jaw H, and adjustable leg B, substantially as described.

4. The adjustable bearings K, in combination with the jaw H, and stock A, substantially as described.

5. The combination of stock A, hinge and jaw H, set-screws $H^2$, lug e, and wedge-formed key $H^1$, substantially as described.

GEORGE H. WELLS.

Witnesses:
A. M. FLORY,
J. HOLMES GANS.